(12) United States Patent
Love

(10) Patent No.: US 9,046,144 B2
(45) Date of Patent: Jun. 2, 2015

(54) INTEGRAL REBOUND, SHEAR, AND FASTENER FOR ISOLATION MOUNT

(75) Inventor: Mickey L. Love, Londonderry, NH (US)

(73) Assignee: VIBRACOUSTIC NORTH AMERICA, L.P., Farmington, MI (US)

( * ) Notice: Subject to any disclaimer, the term of this patent is extended or adjusted under 35 U.S.C. 154(b) by 1257 days.

(21) Appl. No.: 12/019,253

(22) Filed: Jan. 24, 2008

(65) Prior Publication Data

US 2009/0189051 A1 Jul. 30, 2009

(51) Int. Cl.
  *F16F 15/00* (2006.01)
  *F16F 1/393* (2006.01)
  *F16B 35/06* (2006.01)

(52) U.S. Cl.
  CPC .............. *F16F 1/3935* (2013.01); *F16B 35/06* (2013.01)

(58) Field of Classification Search
  CPC ....................................................... F16F 15/00
  USPC ......... 248/562, 565, 570, 608, 609, 634, 635, 248/638, 636; 267/140.3, 141, 142, 267/141.1–141.5, 293; 411/371.1, 372.2, 411/399, 107
  See application file for complete search history.

(56) References Cited

U.S. PATENT DOCUMENTS

| 5,096,153 | A | * | 3/1992 | Seeley et al. ................. 248/635 |
| 5,516,248 | A | * | 5/1996 | DeHaitre ................... 411/387.2 |
| 5,725,221 | A | | 3/1998 | Pekarsky et al. |
| 5,758,861 | A | * | 6/1998 | Feldhaus ....................... 248/638 |
| 6,098,949 | A | * | 8/2000 | Robinson ...................... 248/635 |
| 6,499,714 | B1 | * | 12/2002 | Wike ............................. 248/632 |
| 6,712,571 | B2 | * | 3/2004 | Krohlow et al. ............... 411/45 |
| 7,010,844 | B2 | | 3/2006 | Pekarsky et al. |

* cited by examiner

*Primary Examiner* — Nkeisha Smith
(74) *Attorney, Agent, or Firm* — Harness, Dickey & Pierce, P.L.C.

(57) ABSTRACT

An isolation mount is provided including a frame bracket having an aperture therein. A fastener is received in the aperture. The fastener includes a threaded shaft and a cone-shaped head portion integrally formed with the threaded shaft. The cone-shaped head portion includes a narrow end and a relatively wider end with the narrow end being closer to the threaded shaft than the wider end and a tool engaging portion on the head portion. An elastomeric member is disposed between the fastener and the frame bracket. The design integrates multiple features into a single element thereby greatly improving the assembly process and cost of the isolation mount.

9 Claims, 3 Drawing Sheets

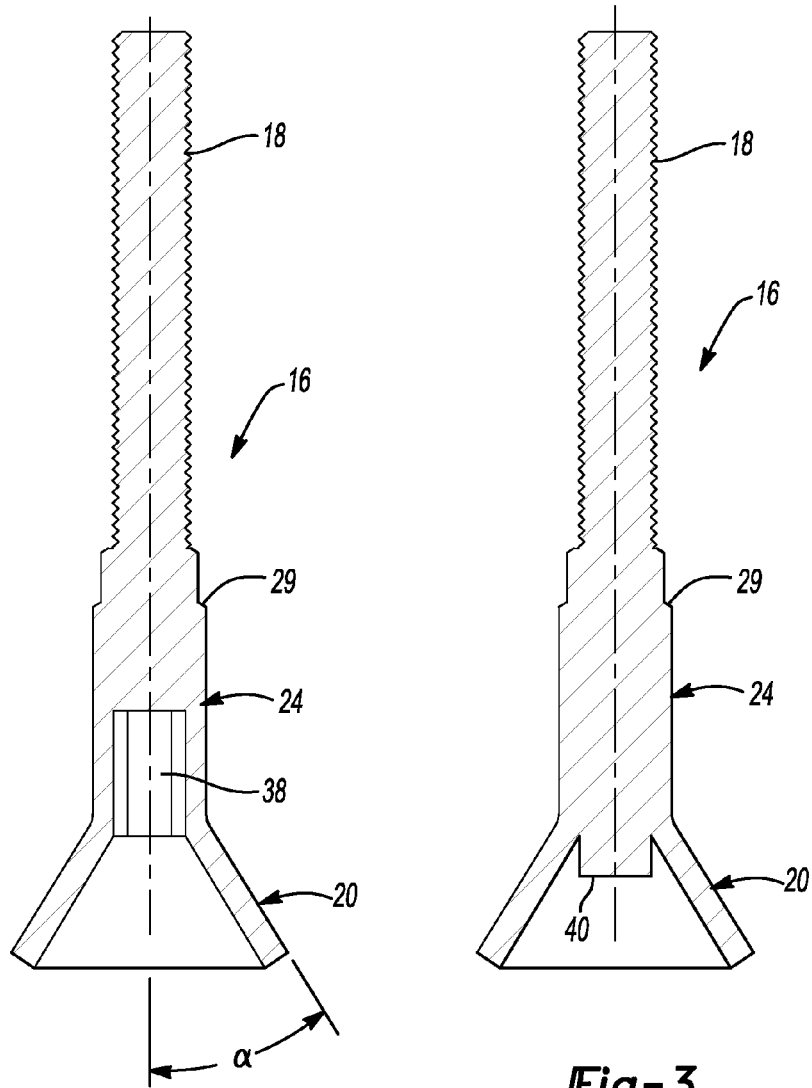

INTEGRAL REBOUND, SHEAR, AND FASTENER FOR ISOLATION MOUNT

FIELD

The present disclosure relates to an isolation mount, and more particularly, to an isolation mount for a subframe mount or mounting a vehicle body to a frame.

BACKGROUND

The statements in this section merely provide background information related to the present disclosure and may not constitute prior art.

Isolation mounts are commonly used for mounting a vehicle body to a frame in order to isolate vibrations transmitted to the vehicle frame by the road, from being transmitted to the vehicle body in order to improve ride performance and passenger comfort. FIG. 4 illustrates a prior art isolation mount 100 including a frame mount 102 having an aperture 104. A lower shear member 106 is disposed in the aperture 104. The lower shear member 106 is made from metal and includes a cone-shaped portion 106a disposed below the aperture 104. The lower shear member 106 also includes a cylindrical body 106b extending from the cone-shaped portion through the aperture 104. An upper compression member 108 having a cylindrical body portion 108a surrounding the cylindrical body portion 106b of the lower shear member 106. The upper compression member 108 also includes an upper flange 108b disposed against an axial end of an upper compression elastomer 110. A lower shear elastomer 112 is disposed between the frame mount 102 and the cone-shaped portion of the lower shear member 106. A fastener 114 is received through the lower shear member 106. A compression washer 116 is disposed in the cone-shaped portion of the lower shear member 106. The vehicle body is mounted above the upper compression member 108 for mounting the body to the frame of the vehicle.

SUMMARY

An isolation mount is provided including a frame bracket having an aperture therein. A fastener is received in the aperture. The fastener includes a threaded shaft and a cone-shaped head portion integrally formed with the threaded shaft. The cone-shaped head portion includes a narrow end and a relatively wider end with the narrow end being closer to the threaded shaft than the wider end and a tool engaging portion on the head portion. An elastomeric member is disposed between the fastener and the frame bracket. The design integrates multiple features into a single element thereby greatly improving the assembly process and cost of the isolation mount.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a cross-sectional view of the fastener used with the isolation mount of FIG. 1;

FIG. 3 is a cross-sectional view of an alternative fastener; and

DETAILED DESCRIPTION

Figure 1:
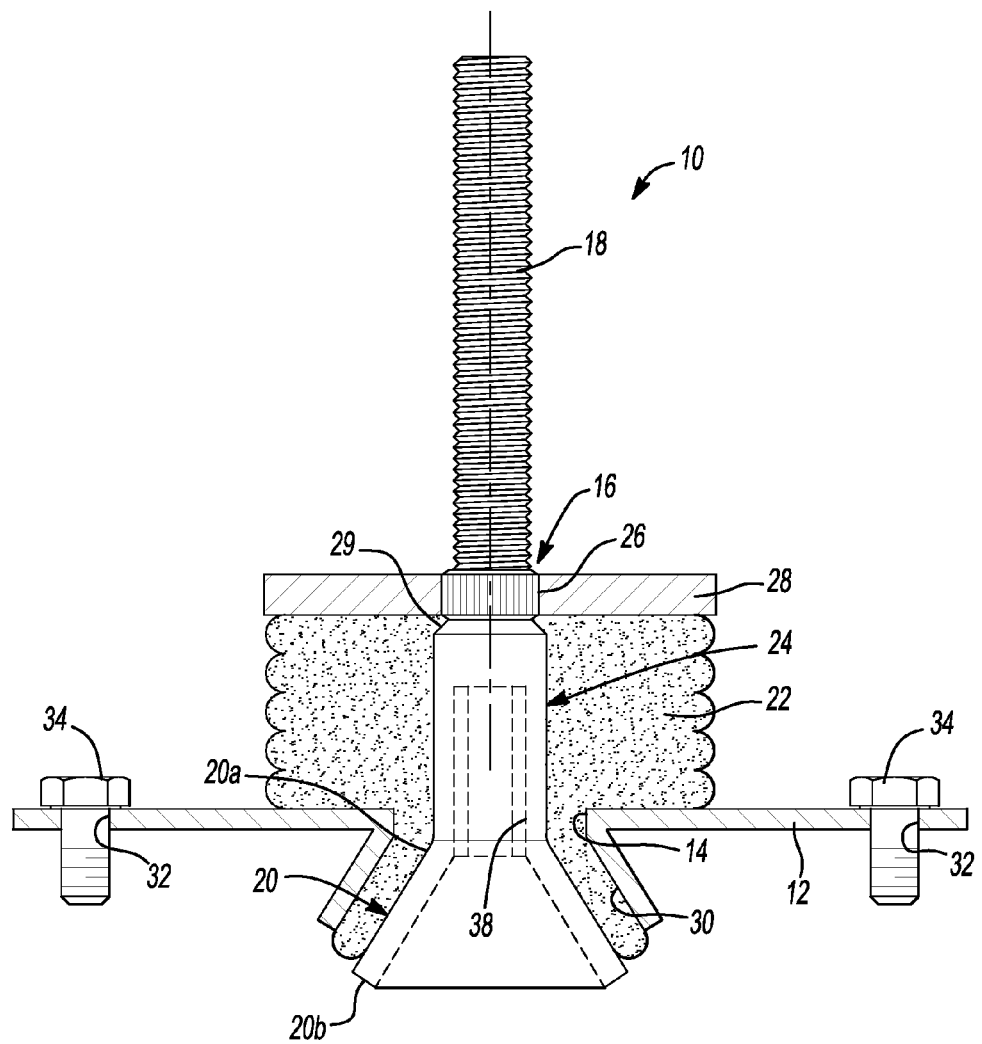
FIG. 1 is a partial cross-sectional view of an isolation mount, according to the principles of the present disclosure.
Figure 4:
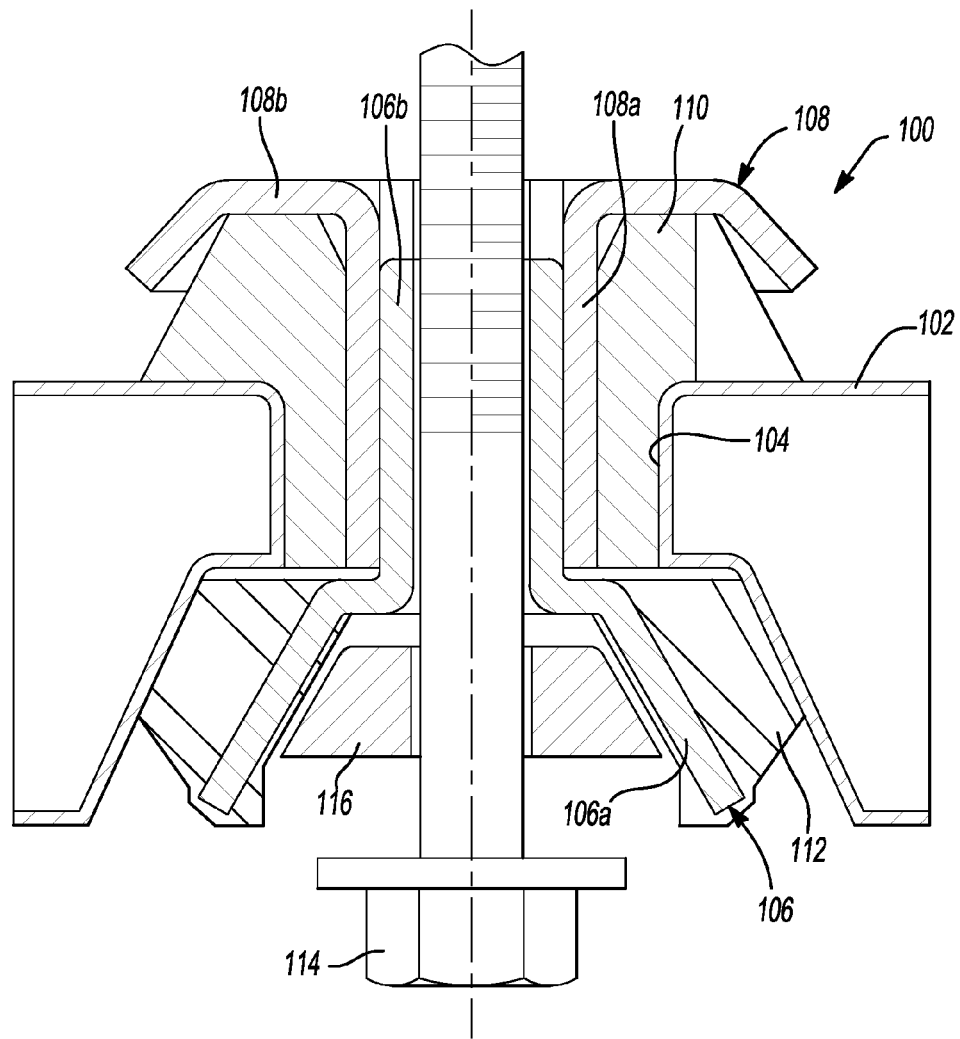
FIG. 4 is a cross-sectional view of a prior art isolation mount.

The following description is merely exemplary in nature and is not intended to limit the present disclosure, application, or uses. It should be understood that throughout the drawings, corresponding reference numerals indicate like or corresponding parts and features.

With reference to FIG. 1, an isolation mount 10, according to the principles of the present disclosure will now be described. The isolation mount 10 includes a frame mount 12 having an aperture 14 therein. A fastener 16 is received in the aperture 14 of the frame mount 12. The fastener 16 includes a threaded shaft portion 18 and a cone-shaped head portion 20 integrally formed with the threaded shaft portion 18. The cone-shaped head portion 20 includes a narrow end 20a and a relatively wider end 20b with the narrow end 20a being closer to the threaded shaft than the wider end 20b.

An elastomer member 22 is disposed between the aperture 14 and fastener 18. The elastomer member 22 can be made from various types of isolation mount elastomer, rubber, urethane, abs, and viscous member, either thermoplastic or thermoset. The fastener 16 includes an intermediate portion 24 between the cone-shaped head portion 20 and threaded shaft portion 18. The intermediate portion includes a knurled surface 26 that engages a compression washer 28 disposed against an end of the elastomeric member 22. The intermediate portion 24 of the fastener 16 provides a shoulder 29 adjacent to the knurled portion 26 against which the compression washer 28 rests.

The frame mount 12 can include a cone-shaped interior surface 30 adjacent to the aperture 14. The frame mount 12 can also include apertures 32 for receiving fasteners 34 for mounting the frame bracket to the vehicle frame. The elastomeric member 22 is disposed between the interior cone surface 30 of the frame mount 12 and the cone-shaped head portion 20 of the fastener 16. The cone-shaped head portion 20 has a larger diameter than the aperture 14. The fastener 16 can include a recessed cavity 38 defining a tool engaging portion. The tool engaging portion can have a hex-shaped configuration for receiving an Allen wrench or other type of tool engaging portion as is known in the art. As shown in FIG. 3, the tool engaging portion can include a hex-shaped head portion 40 or other tool engaging portion extending from the fastener 16.

The cone-shaped head portion 20 has an outer conical surface angled with respect to an axis of the threaded shaft at an angle $\alpha$ of between 15 and 75 degrees. In the embodiment illustrated, the outer conical surface is angled with respect to the axis of the thread shaft at an angle of approximately 30 degrees. With the isolation mount 10 of the present disclosure, the elastomeric material 22 is disposed between the cone-shaped head portion 20 and the cone-shaped interior surface 30 of the frame mount 12 and provides vibration isolation in a vertical and lateral direction. The elastomeric material disposed between the upper surface of the frame mount 12 and the compression washer 28 provides isolation in a vertical compression direction. The fastener 16 can be made from steel, aluminum, brass or other common fastener materials.

The design of the present disclosure integrates the rebound/compression face, the inside shear cylinder and the fastener into one integrated element. This integration reduces three separate elements into one element as compared to the prior art isolation mount system. The design of the present disclosure also establishes the assembled height of the isolator.

What is claimed is:

1. An isolation mount, comprising:
a frame bracket having an aperture therein, defining a cone shaped interior surface;
a fastener received in said aperture, said fastener including a threaded shaft, a cone shaped head portion integrally formed with said threaded shaft, said cone shaped head portion including an outer conical surface having a narrow end and a relatively wider end, said narrow end being closer to said threaded shaft than said wider end and a tool engaging portion on said head portion; and
an elastomeric member disposed between said fastener and said cone shaped interior surface of said frame bracket, wherein said elastomeric member is disposed radially outward from and directly against said outer conical surface of said cone shaped head portion, and is disposed radially inward from and directly against said cone shaped interior surface of said frame bracket.

2. The isolation mount according to claim 1, further comprising a compression washer disposed against an end of said elastomeric member.

3. The isolation mount according to claim 2, wherein said fastener includes an intermediate portion between said threaded shaft and said cone shaped head portion, said intermediate portion having a knurled surface received in a aperture in said compression washer.

4. The isolation mount according to claim 3, wherein said intermediate portion includes a cylindrical surface between said knurled surface and said cone shaped head.

5. The isolation mount according to claim 1, wherein said tool engaging portion includes a cavity recessed in said head portion.

6. The isolation mount according to claim 1, wherein said tool engaging portion includes a hexagonal shaped head portion attached to said cone shaped head portion.

7. The isolation mount according to claim 1, further comprising an intermediate portion between said threaded shaft and said cone shaped head portion, said intermediate portion having a knurled surface.

8. The isolation mount according to claim 1, wherein said cone shaped head portion has an outer conical surface angled with respect to an axis of said threaded shaft at an angle of approximately 30 degrees.

9. The isolation mount according to claim 1, wherein said cone shaped head portion has an outer conical surface angled with respect to an axis of said threaded shaft at an angle of between 15 and 75 degrees.

* * * * *